United States Patent
Elkins, II et al.

(10) Patent No.: US 7,228,036 B2
(45) Date of Patent: Jun. 5, 2007

(54) ADJUSTABLE TETHER ASSEMBLY FOR FIBER OPTIC DISTRIBUTION CABLE

(75) Inventors: Robert B. Elkins, II, Hickory, NC (US); Dennis M. Knecht, Hickory, NC (US); James P. Luther, Hickory, NC (US); Lars K. Nielsen, Denver, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 177 days.

(21) Appl. No.: 10/999,691

(22) Filed: Nov. 30, 2004

(65) Prior Publication Data

US 2006/0115220 A1    Jun. 1, 2006

(51) Int. Cl.
*G02B 6/44*    (2006.01)
(52) U.S. Cl. .................. 385/100; 385/134; 385/136
(58) Field of Classification Search ........ 385/100–105, 385/135; 29/401.1
See application file for complete search history.

(56) References Cited

U.S. PATENT DOCUMENTS

| | | | |
|---|---|---|---|
| 4,884,863 A | 12/1989 | Throckmorton | 350/96.2 |
| 4,961,623 A | 10/1990 | Midkiff et al. | 350/96.2 |
| 5,004,315 A | 4/1991 | Miyazaki | 350/96.15 |
| 5,042,901 A | 8/1991 | Merriken et al. | 385/135 |
| 5,121,458 A | 6/1992 | Nilsson et al. | 385/100 |
| 5,125,060 A * | 6/1992 | Edmundson | 385/100 |
| 5,210,812 A * | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,657,413 A | 8/1997 | Ray et al. | 385/139 |
| 5,778,122 A | 7/1998 | Giebel et al. | 385/55 |
| 5,892,870 A | 4/1999 | Fingler et al. | 385/59 |
| RE36,592 E | 2/2000 | Giebel et al. | 385/100 |

(Continued)

FOREIGN PATENT DOCUMENTS

DE    3537684    4/1987

(Continued)

OTHER PUBLICATIONS

Tyco Electronics Raychem Product Sheet, FITS FOSC—Factory Installed Termination System for Fiber Optic Cable Splices, 1999, 2 pages.

*Primary Examiner*—Frank G. Font
*Assistant Examiner*—Guy G. Anderson
(74) *Attorney, Agent, or Firm*—Jeffrey S. Bernard

(57) ABSTRACT

An adjustable tether assembly for a fiber optic distribution cable includes a tether cable and an overmolded housing secured at the end of the tether cable having at least one connector port. The tether assembly is attached to the distribution cable such that the position of the connector port is adjustable along the length of the distribution cable for mitigating differences between the pre-engineered span length distance and the actual span length distance following installation of the distribution cable. A method for mitigating a span length measurement difference in a pre-engineered fiber optic communications network is provided that includes optically connecting an adjustable tether assembly at a mid-span access location of a fiber optic distribution cable and positioning a housing secured at the free end of a tether cable having at least one connector port at a desired location in the network to compensate for the span length measurement difference.

21 Claims, 9 Drawing Sheets

U.S. PATENT DOCUMENTS

| | | | |
|---|---|---|---|
| RE37,028 E | 1/2001 | Cooke et al. | 385/112 |
| 6,466,725 B2 | 10/2002 | Battey et al. | 385/135 |
| 6,493,500 B1 * | 12/2002 | Oh et al. | 385/135 |
| 6,619,697 B2 | 9/2003 | Griffioen et al. | 285/126.1 |
| 6,621,975 B2 | 9/2003 | Laporte et al. | 385/135 |
| 6,880,219 B2 * | 4/2005 | Griffioen et al. | 29/401.1 |

FOREIGN PATENT DOCUMENTS

| | | |
|---|---|---|
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-054204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001116968 | 4/2001 |

* cited by examiner

ADJUSTABLE TETHER ASSEMBLY FOR FIBER OPTIC DISTRIBUTION CABLE

BACKGROUND OF THE INVENTION

1. Field of the Invention

The present invention relates generally to an interconnection, or "tap," point in a fiber optic communications network. More specifically, the invention is a fiber optic distribution cable having an adjustable tap point comprising at least one connector port attached by a tether to a mid-span access location of the fiber optic distribution cable, wherein the tether provides a length of slack cable to permit the connector port to be positioned at a desired location in the fiber optic communications network.

2. Description of the Related Art

Optical fiber is increasingly being used for a variety of broadband communications including voice, video and data transmissions. As a result of the increasing demand for broadband communications, fiber optic networks typically include a large number of mid-span access locations at which one or more optical fibers are terminated from a distribution cable and interconnected with a branch cable or a drop cable. The mid-span access locations provide an interconnection point, also referred to herein as a "tap" point, from the distribution cable leading to another network distribution or termination point, or from the distribution cable leading directly to an end user, commonly referred to as a subscriber, thereby extending an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the large number of mid-span access locations and the unique demands of optical fibers and optical connections, a tap point is needed for providing access to terminated optical fibers in an FTTx network. More particularly, a tap point is needed that is capable of being adjustably positioned along the length of a distribution cable, or positioned away from the distribution cable in order to mitigate span length measurement differences that are encountered when installing a fiber optic distribution cable having predetermined mid-span access locations in a fiber optic communications network.

In one example of a fiber optic communications network, one or more drop cables are interconnected with a distribution cable at a tap point comprising a mid-span access location. Substantial expertise and experience are required to configure the optical connections in the field. In particular, it is often difficult to identify a particular optical fiber of the distribution cable to be optically connected with an optical fiber of a drop cable. Once identified, the optical fiber of the distribution cable is typically joined directly to the optical fiber of the drop cable at the mid-span access location using conventional splicing techniques, such as fusion splicing. In other instances, the optical fiber of the distribution cable and the optical fiber of the drop cable are first spliced to a short length of optical fiber having an optical connector mounted on the other end, which is generally referred to in the art as a "pigtail." The pigtails are then routed to opposite sides of a connector adapter sleeve to interconnect the drop cable with the distribution cable. In either case, the process of configuring the mid-span access location is not only time consuming, but frequently must be accomplished by a highly skilled field technician at significant cost and under field working conditions that are less than ideal. In situations in which a mid-span access location is enclosed within a conventional splice closure, reconfiguring optical connections within the splice closure is especially difficult, based in part on the relatively inaccessible location of the closure, the limited workspace available within the closure, and the inability to readily remove the closure from the distribution cable. Further, once the spliced optical connections are made, it is labor intensive, and therefore relatively costly, to reconfigure the optical connections or to add additional optical connections.

In order to reduce installation costs by permitting less experienced and less skilled technicians to make optical connections and to reconfigure optical connections at mid-span access locations in the field, communications service providers are increasingly pre-engineering new fiber optic networks and demanding factory-prepared interconnection solutions, commonly referred to as "plug-and-play" type systems. There are currently several methods to build a distribution cable assembly for economical deployment and field installation. In one example, the distances between desired network distribution or termination points (i.e., tap points) are measured with great accuracy and a factory-prepared distribution cable assembly is built with mid-span access locations positioned precisely at the desired tap points. However, in this instance the length of the distribution cable between mid-span access locations must be exact, and the deployment of the distribution cable must be performed accurately so that no extra cable length is used between the tap points. If extra length of distribution cable is used, the incorrect placement of even one mid-span access location will have a compounding effect on the position of each downstream mid-span access location. As a result, all downstream mid-span access locations will be out of position and the length of distribution cable will come up short at the end of the cable run. Obviously, measuring the absolute distances between mid-span access locations and building a distribution cable assembly with accurate distances between mid-span access locations is a difficult undertaking. Furthermore, any error in the manufacturing process may result in the entire distribution cable assembly being unusable, and therefore scrapped. Alternatively, an excess length of cable (i.e., slack) may be intentionally built into the distribution cable at each mid-span access location to insure that the tap point can always be positioned in the field at exactly the desired location. The obvious drawbacks with such a distribution cable assembly are the cost associated with the excess lengths of the cable and the associated need to store the cable slack in an aesthetic and practical manner.

In addition to the difficulties associated with manufacturing a distribution cable assembly having the tap points in the pre-engineered locations, there are also problems encountered with using conventional components to optically connect the optical fibers of the distribution cable with optical fibers of a branch cable or drop cable at the mid-span access locations. For example, rigid enclosures are typically used to protect the section of the distribution cable that must be exposed to access the appropriate optical fibers and the splices. Distribution cables provided with conventional enclosures tend to be large in size and inflexible, and thus, unable to satisfy common deployment constraints, such as being wound onto a reel, deployed through conduits having a relatively small inner diameter or significant bends, or deployed through conventional aerial lashing equipment, such as sheaves and rollers. Furthermore, such enclosures are often structurally complex and difficult to install.

Accordingly, there is a specific and unresolved need for a factory-prepared, fiber optic distribution cable having an adjustable tap point that mitigates the difference between the pre-engineered span length distance and the actual span length distance following installation of the distribution cable. Further, there is a need for a fiber optic distribution cable including at least one predetermined mid-span access location for providing access to at least one preterminated optical fiber and a tether assembly including at least one connector port for interconnecting the preterminated optical fiber with an optical fiber of a branch cable or drop cable at a desired location along the length of the distribution cable. To accommodate any installation environment, the tap point preferably has a small diameter and is flexible enough to be wound onto a reel, deployed through a conduit having a relatively small inner diameter or significant bends, or deployed using conventional aerial lashing equipment. In addition, there is a specific and unresolved need for a factory-prepared fiber optic distribution cable that does not require a highly skilled field technician or extensive field labor to interconnect optical fibers of the distribution cable with optical fibers of a branch cable or drop cable.

BRIEF SUMMARY OF THE INVENTION

To achieve the foregoing and other objects, and in accordance with the purposes of the invention as embodied and broadly described herein, the present invention provides various embodiments of a fiber optic distribution cable having an adjustable tap point that includes a relatively short length of cable, referred to herein as a "tether", that permits at least one connector port to be accurately positioned at a desired location in a fiber optic communications network. In further embodiments, the present invention provides a fiber optic distribution cable assembly having at least one, and preferably a plurality of, predetermined mid-span access locations that serve as "tether attach points," and at least one connector port that is attached to a respective mid-span access location by a tether. The connector port is slidable along the length of the distribution cable, or may be separated from and positioned away from the distribution cable in order to mitigate span length measurement differences encountered during installation of the distribution cable and thereby provide a distribution or termination point at a desired location within a fiber optic communications network. The connector port and tether are manufactured in the factory and spliced or otherwise optically connected in the field to a previously installed fiber optic distribution cable. Alternatively, a fiber optic distribution cable assembly including a tether and at least one connector port is manufactured in the factory (i.e., factory-prepared) for a pre-engineered fiber optic communications network and wound onto a cable reel for deployment in the field. The tether provides a relatively short length of cable at each mid-span access location to allow a distribution or termination point to be positioned at a desired location, thereby eliminating the need for absolute accuracy in the engineering of the fiber optic network, the manufacture of the distribution cable assembly and the deployment of the distribution cable assembly.

In an exemplary embodiment, the present invention provides a factory-prepared tether assembly comprising at least one connector port including at least one receptacle for receiving a mating plug of a fiber optic branch cable or drop cable. The tether assembly further includes a flexible and rugged housing for protecting the connector port and a relatively short length of a tether cable for attaching the connector port to a fiber optic distribution cable and interconnecting at least one optical fiber of the branch cable or drop cable with at least one preterminated optical fiber of the distribution cable. In preferred embodiments, the free end of the tether is optically connected to, and the connector port is tethered at, a predetermined mid-span access location positioned along the length of a fiber optic distribution cable.

In another exemplary embodiment, the present invention provides a factory-prepared fiber optic distribution cable assembly comprising at least one predetermined mid-span access location positioned along the length of a distribution cable, one or more preterminated optical fibers accessed from the at least one mid-span access location, a flexible injection molded body encapsulating the mid-span access location, at least one tether cable attached to the distribution cable at the mid-span access location and at least one connector port adjustably positioned at the end of the tether. Receptacles provided at the one or more connector ports are adapted to receive, secure and align corresponding fiber optic plugs. The connector ports may include any number of receptacles arranged in any manner as long as each receptacle provides access to at least one optical fiber of the tether that is interconnected with at least one preterminated optical fiber of the distribution cable. The upstream ends of the one or more optical fibers of the tether are optically connected to the preterminated optical fibers of the distribution cable. The downstream ends of the one or more optical fibers of the tether are available for interconnecting the preterminated optical fibers of the distribution cable with respective optical fibers of one or more fiber optic branch cables or drop cables.

The downstream ends of the one or more optical fibers of the tether are preferably connectorized and are received within a receptacle including an alignment means for aligning the optical fibers of the tether and the optical fibers of the drop cables. In all embodiments, the connector ports may be configured with a variety of connector types, such as but not limited to SC, LC, DC, FC, ST, SC/DC, MT, MT-RJ, MTP, MPO and other like single or multi-fiber ferrules now known or hereafter developed. Preferably, the tether has a length up to about 100 feet, more preferably up to about 25 feet, and most preferably a length of about 12 to about 15 feet.

In yet another exemplary embodiment, the present invention provides a method of mitigating cable length errors in a pre-engineered fiber optic communications network comprising a fiber optic distribution cable assembly having at least one mid-span access location. The method comprises optically connecting preterminated optical fibers of the distribution cable to one or more optical fibers of a tether cable attached to the distribution cable at the mid-span access location, and positioning at least one connector port at a downstream end of the tether at a desired location to compensate for cable length errors encountered in the pre-engineering of the network, or the manufacture or deployment of the distribution cable.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
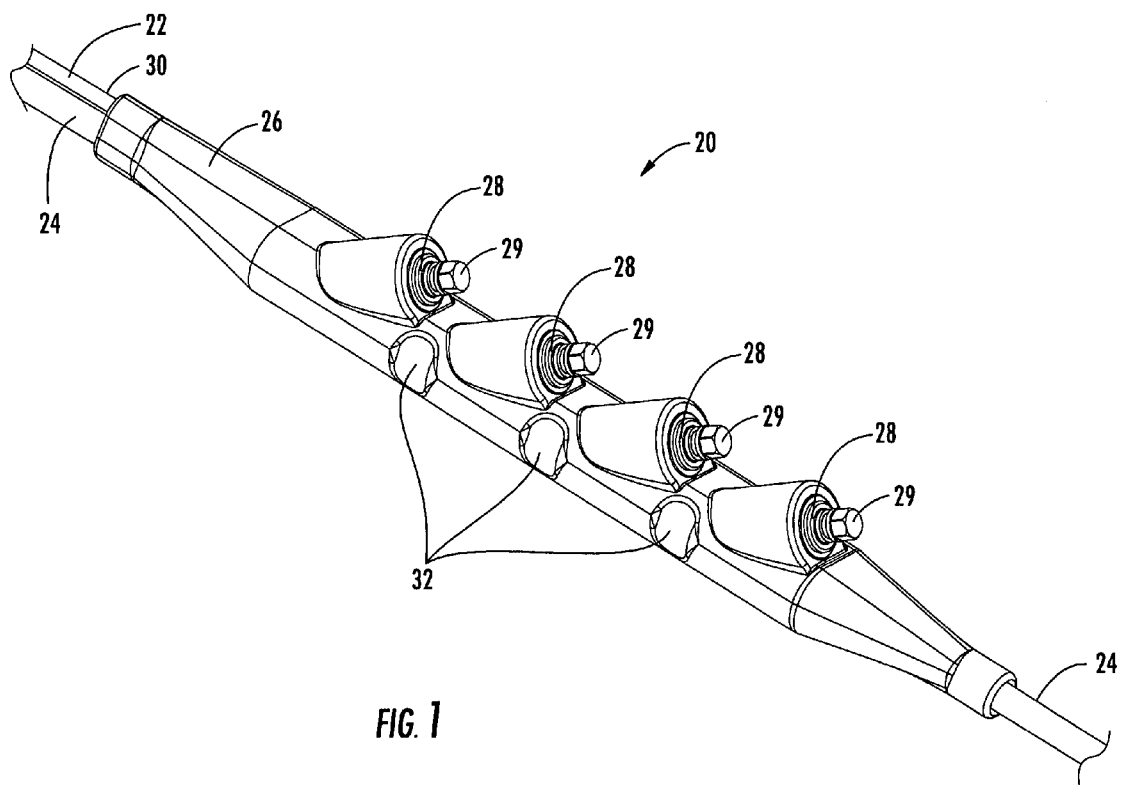
FIG. 1 is a perspective view of an adjustable tether assembly including a plurality of connector ports arranged in a linear fashion, a length of tether cable and a rugged and flexible housing with a distribution cable passing therethrough in accordance with an exemplary embodiment of the present invention.

The present invention will now be described more fully hereinafter with reference to the accompanying drawings in which exemplary embodiments of the invention are shown. However, the invention may be embodied in many different forms and should not be construed as limited to the embodiments set forth herein. These exemplary embodiments are provided so that this disclosure will be both thorough and complete, and will fully convey the scope of the invention and enable one of ordinary skill in the art to make, use and practice the invention. Like reference numbers refer to like elements throughout the various drawings.

In one method of use, the tether assembly of the present invention mitigates span length measurement issues that result from the improper location of a mid-span access location on a fiber optic distribution cable due to differences between a pre-engineered span length distance and the actual span length distance following installation of a distribution cable. In another method of use, the tether assembly may be used to provide a drop cable interconnection point at a desired location away from a mid-span access location of a distribution cable, such as a telephone pole, hand-hole, pedestal, network connection terminal, etc. In all embodiments described herein, the tether assembly is connected to a mid-span access location along the length of a distribution cable and provides a customizable tether length that is used to correct the placement or extend the reach of the distribution cable, thus providing a correct or convenient location in a fiber optic network to connect another fiber optic cable, referred to generically herein as a "drop cable" to the fiber optic network.

In the embodiments illustrated herein, terminated optical fibers accessed from a mid-span access location of a distribution cable are spliced or otherwise optically connected to optical fibers of a tether cable having a predetermined length preferably not exceeding about 100 feet, more preferably not exceeding about 25 feet, and most preferably between about 12 and about 15 feet. The remaining optical fibers of the distribution cable are managed and routed separately from the terminated and "tethered" optical fibers such that they extend uninterrupted through the distribution cable and are available for terminating at other downstream mid-span access locations. In preferred embodiments, the distribution cable comprises a plurality of mid-span access locations at predetermined spaced apart locations along the cable length, thus providing multiple access locations that serve as "tether attach points" for attaching the tether assembly to the distribution cable. The fiber optic distribution cable may be wound onto a reel for shipping and deployment through a conduit having a relatively small inner diameter or significant bends, or through conventional aerial lashing equipment, such as sheaves or rollers.

The tether and mid-span access location may present their respective optical fibers for interconnection in an optical communications network in various configurations, including but not limited to, splice-ready optical fibers, pre-connectorized optical fibers and pre-connectorized optical fibers positioned within receptacles comprising alignment means. One or more connectorized drop cables are routed to a receptacle provided within a connector port located at the end of the tether at any time subsequent to the initial deployment of the distribution cable. In all embodiments, the connector port may be configured with a variety of connector types, such as but not limited to SC, LC, DC, FC, ST, SC/DC, MT-RJ, MTP, MPO and other like single or multi-fiber ferrules now known or hereafter developed.

In all embodiments shown and described herein, various types of distribution cables may be accommodated, such as monotube, loose tube, central tube, ribbon and the like. One example of a type of distribution cable suitable for use in conjunction with the present invention is an ALTOS® dielectric cable available from Corning Cable Systems LLC of Hickory, N.C. The ALTOS® dielectric cable is a lightweight fiber optic cable designed for both buried (conduit) and aerial (lashed) deployments. In another example, the distribution cable is a Standard Single-Tube Ribbon (SST-Ribbon™) cable available from Corning Cable Systems LLC of Hickory, N.C. The SST-Ribbon™ cable contains readily identifiable twelve-fiber ribbons in a gel-filled tube. Regardless, the distribution cable is preferably designed to provide stable performance over a wide range of temperatures and to be compatible with any telecommunications grade optical fiber. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers or any other expedient for transmitting light signals now known or hereafter developed. In preferred embodiments, the distribution cable is flexible, easy to route and has no preferential bend. In all embodiments shown and described herein, various types of tethers may also be accommodated, such as monotube, loose tube, central tube and ribbon, and the tether may be disposed within another tubular body in a cable assembly.

Referring to FIG. 1, an adjustable tether assembly 20 including a predetermined length of tether cable 22 for interconnection with a distribution cable 24 at a mid-span access location is shown. In this embodiment, the tether cable 22 terminates in at least one, and preferably a plurality of connector ports 28, also referred to herein as an "optical connection terminal." The connector ports 28 provide access to one or more preterminated, and preferably pre-connectorized, optical fibers of the tether 22 that are optically connected to preterminated optical fibers of the distribution cable 24. The connector ports 28 may be used to readily interconnect optical fibers of one or more connectorized fiber optic drop cables (not shown) with preterminated optical fibers of a fiber optic distribution cable 24 at a desired location in a fiber optic communications network. In various embodiments, a plurality of drop cables extending from a downstream location, such as a subscriber premises or a pedestal may be optically connected to the connector ports 28, thus allowing a field technician to readily connect, disconnect or reconfigure the drop cables at a convenient location and without disturbing the other connected drop cables.

The tether assembly 20 includes a housing 26 preferably made by an injection molding process, referred to herein as "overmolding" or "overmolded." In the embodiment shown in FIG. 1, the housing 26 surrounds but is not fixed to the distribution cable 24 such that the housing 26 may be slid along the length of the distribution cable but not removed from the distribution cable. As will be described in more detail below, alternative embodiments of the present invention provide a tether assembly 20 capable of being both slid along the length of the distribution cable 24 or removed from the distribution cable 24 and positioned at a desired location. In all embodiments, the overmolded housing 26 is created using an overmolding tool (not shown) defining a predetermined shape based upon the desired number of receptacles 28.

The overmolding process involves preparing the sheath 30 of the tether cable 22 in a manner known in the art, such as by cleaning and roughening, flame preparing or chemically preparing the surface to promote friction or adhesion with the overmolding material. The connector ports 28, including their respective optical connectors and optical fibers, the distribution cable 24 and the prepared end of the tether cable 22 are all laid within one portion of the overmolding tool. In alternative embodiments, a protective layer, such as, but not limited to, a foil made of tin or aluminum, may be used to protect the underlying components of the tether assembly 20 prior to overmolding the housing 26. Other materials may be used to protect the components prior to overmolding, provided that the material is capable of being shaped or formed to the underlying components and their structure. A layer of foil or other material is placed around the distribution cable in order to reduce friction and prevent adhesion between the overmolded housing 26 and the distribution cable 24 so that the tether assembly 20 may be slid along the length of the distribution cable 24 after installation to position the connector ports 28 at a desired location within the communications network.

Once the components have been appropriately positioned within the overmolding tool, a second portion of the tool is positioned with the first portion to form a cavity for receiving the overmolding material. Suitable examples of overmolding materials include, but are not limited to, polyurethanes, silicone and like rugged and flexible materials. The overmolding materials are injected into the cavity defined by the overmolding tool. The overmolded housing 26 provides a protective shell, maintains sealing integrity and is capable of withstanding crush forces up to at least about 300 lbs. The housing 26 has a length and width sufficient to accommodate the desired number of connector ports 28 and is sufficiently flexible to permit the assembly to be deployed through relatively small diameter conduit or through aerial lashing equipment. The degree of flexibility is dependent upon the material chosen and the geometry of the underlying components. For example, the overmolded housing 26 may have a preferential bend in the same direction as the preferential bend of the underlying distribution cable 24. Voids 32 may be molded into the housing 26 in the direction of the preferential bend in order to influence the housing 26 to bend in a certain direction. The voids 32 reduce the amount of housing material on the side of the housing 26 that must be compressed during bending, thus facilitating bending in that direction. In an alternative embodiment, a strength member may be added to the tether assembly 20 prior to overmolding in order to force the distribution cable 24 and the tether 22 to bend along a common axis. In the embodiment shown, the shape of the overmolded housing 26 also forces the assembly to bend along a preferred axis. In all embodiments, the overmolded housing 26 may have any desired shape, however, the preferred shape is both low profile and has rounded or tapered ends so as to avoid snagging during deployment of the assembly through conduits or aerial lashing equipment. The shape of the housing 26 surrounding the connector ports 28 is also rounded in order to avoid snagging.

The embodiment shown in FIG. 1 comprises four connector ports 28, also referred to herein as optical connection nodes, for interconnecting optical fibers of the tether cable 22 to one or more drop cables (not shown). The optical fibers of the tether cable 22 are in turn interconnected with the preterminated optical fibers of the distribution cable 24 at the mid-span access location Thus, the tether assembly 20 of the present invention is operable for interconnecting preterminated optical fibers of a distribution cable with optical fibers of one or more drop cables. In one embodiment, each connector port 28 comprises a rugged and strain-relieving receptacle, adapter or alignment sleeve for presenting a connectorized optical fiber of the tether cable 22 and receiving a pre-connectorized plug of a fiber optic drop cable. In other words, each connector port 28 is a fiber optic receptacle operable for receiving one or more preterminated optical fibers of the tether cable 22 on the inside of the connector port, and a pre-connectorized fiber optic drop cable on the outside of the connector port. As used herein, the term "connector port" is intended to broadly include an opening through which the optical fibers (splice-ready or connectorized) of the tether cable 22 are optically connected to the optical fibers of a drop cable. In various embodiments, the connector port 28 may include a factory-installed connector alignment sleeve (not shown) for aligning and maintaining mating connectors in opposing physical contact. Preferably, the connector port 28 further provides an environmental seal at the optical connection between the optical fibers of the tether cable 22 and the drop cable. The connector ports 28 may also serve to transfer any tension load on the drop cables to the housing 26. While four connector ports 28 are generically shown arranged in a linear fashion, it is envisioned that the tether assembly 20 may have any size or shape suitable for holding one or more connector ports 28. Each connector port 28 is covered with a protective dust cap 29 during shipping and deployment and until the connector port 28 is needed. The protective dust cap 29 prevents water and other contaminants from penetrating the connector port 28 and damaging the optical fiber(s) disposed within.

Figure 2:
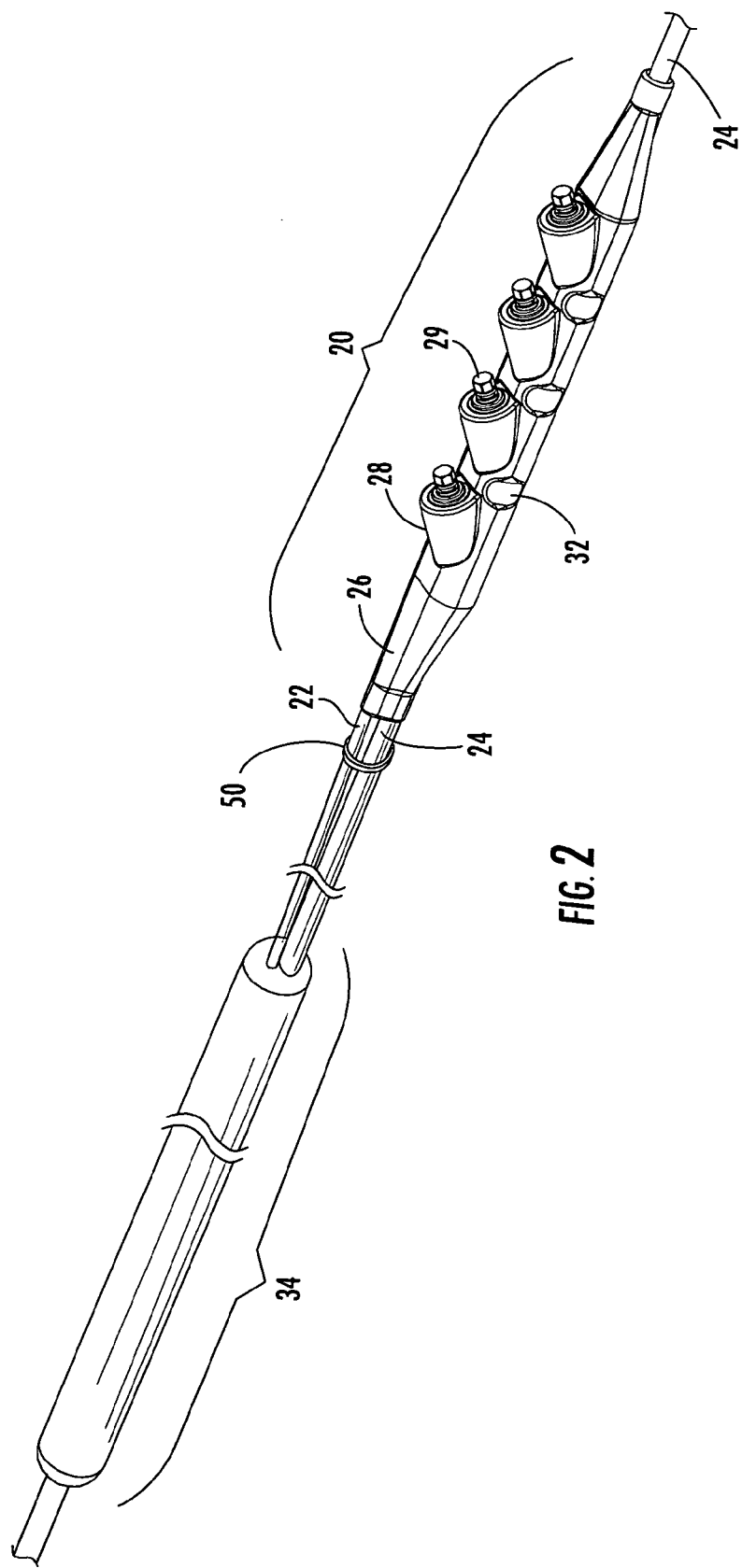
FIG. 2 is a perspective view of a fiber optic distribution cable assembly including the tether assembly of FIG. 1 connected to the distribution cable at a predetermined mid-span access location.
Figure 3:
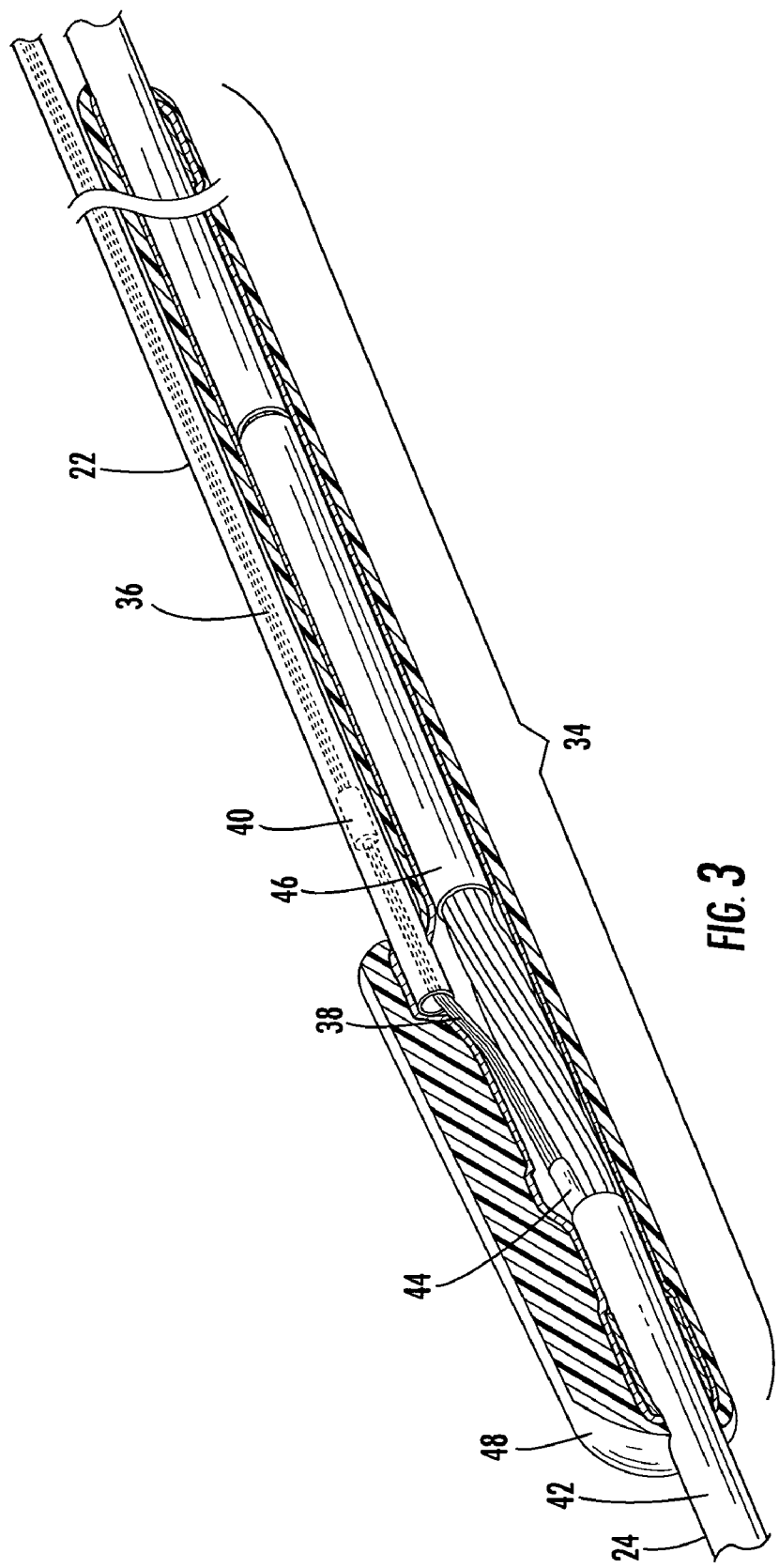
FIG. 3 is a perspective view of a mid-span access location positioned along the length of a fiber optic distribution cable shown with a tether cable attached to the mid-span access location and overmolded in the factory or in the field using a field repair kit.

Referring to FIG. 2, an adjustable tether assembly 20 including a relatively short length of tether cable 22 is shown connected to a distribution cable 24 at a typical mid-span access location 34 that has been prepared in the factory. In the embodiment shown, the mid-span access location 34, also referred to herein as a "tether attach point" is overmolded in the factory. In embodiments in which the tether assembly 20 is removable from the distribution cable 24 and may be added at a mid-span access location 34 subsequent to cable installation, the mid-span access may be performed in the field and may be overmolded or encapsulated with a protective enclosure in the field. The mid-span access location 34 provides a means for optically connecting one or more optical fibers 36 of a tether cable 22 to one or more optical fibers 38 of a fiber optic distribution cable 24. As best shown in FIG. 3, the tether 22 includes a fiber optic cable or a tubular body having one or more optical fibers disposed within the tubular body. As is well known and understood in the art, the one or more optical fibers 36 of the tether cable 22 and the one or more optical fibers 38 of the distribution cable 24 may be spliced together in any conventional manner, such as by fusion or mechanical splicing, either individually or in mass. The splice point is shown schematically by reference numeral 40 and may be located either within or outside of the tether cable 22. In an alternative embodiment, the optical fibers 38 of the distribution cable 24 may be optically connected to the optical fibers 36 of the tether cable 22 with one or more single fiber or multifiber optical connectors mounted upon the ends of the optical fibers (i.e., a "pigtail").

The mid-span access location 34 is the point on the distribution cable 24 at which a single fiber or a subset of optical fibers 38 are preterminated and routed separate from the remaining intact optical fibers of the distribution cable. To prepare a mid-span access location 34 in either the field or the factory, a section of the sheath 42 of the distribution cable 24 is removed to expose the plurality of optical fibers 38 within the cable sheath 42. As shown, the optical fibers 38 are disposed within individual buffer tubes 44 that are helically wound in a known manner. The exposed length of the distribution cable 24 and the buffer tubes 44 may vary depending on the length of the optical fibers 38 needed and the manner in which the optical fibers 38 are accessed and terminated. However, in a preferred embodiment, the length ranges between about 3 and about 36 inches. In one example of accessing the optical fibers from the distribution cable 24, a ring-cut may be made through the sheath 42 upstream of the exposed section of buffer tubes 44. By ring cutting the cable sheath 42, a portion 46 becomes slidable along the exposed section of buffer tubes 44 and may remain in place to cover a portion of the exposed buffer tubes 44 once the one or more optical fibers 38 have been severed and the ends removed, referred to in the art as "fished," from their respective buffer tube 44. The exposed length of the buffer tubes 44 allows for about 5 to about 30 inches of optical fiber to be withdrawn from the buffer tube 44 for subsequent splicing, thereby providing sufficient slack fiber length for more than one splice attempt.

For a given mid-span access location 34, the appropriate buffer tube 44 may be accessed in multiple places using a standard No-Slack Optical Fiber Access Tool (NOFAT) available from Corning Cable Systems LLC of Hickory, N.C. The NOFAT tool is suitable for use in locations in which a limited amount of cable slack can be obtained and the buffer tubes 44 remain helically wrapped around a central member (not shown). The NOFAT tool provides a guide that allows a scalpel to open a buffer tube 44 without cutting completely through the buffer tube 44 or the optical fibers disposed within the buffer tube 44. The NOFAT tool is compatible with standard sizes of buffer tubes 44 utilized in Corning Cable Systems ALTOS® Cable.

Although not shown, two buffer tube access points are cut on the appropriate buffer tube 44. Starting at the downstream access point, a predetermined number of optical fibers 38 are accessed and severed. In a buffer tube 44 comprising twelve optical fibers, four or eight optical fibers, for example, may be preterminated. Alternatively, optical fibers may be terminated from more than one buffer tube 44 in a like manner. The remaining optical fibers disposed within the buffer tube 44 are not cut and continue downstream through the distribution cable 24. The severed optical fibers 38 are then fished out of the upstream access point cut on the same buffer tube 44, thereby exposing the total optical fiber length of about 5 to 30 inches. The optical fibers 38 are smoothly transitioned out of the buffer tube 44 in a known manner. The optical fibers 38 of the distribution cable 24 are then spliced, as described above, to the optical fibers 36 of the tether cable 22. The tether 22 may be securely attached at the mid-span access location 34 by overmolding the upstream end of the tether cable 22 with the mid-span access location 34 within the overmolded body 48. Alternatively, in embodiments in which the mid-span access location 34 is not overmolded, the tether cable 22 may be secured at the mid-span access location 34 using a conventional fastener or a similar feature provided within a conventional closure.

Referring again to FIG. 2, the tether cable 22 has a predetermined length and ensures that the tether assembly 20 (and in particular the connector ports 28) may be positioned at any desired location regardless of the placement of the mid-span access location 34 along the length of the distribution cable 24. The length of the tether cable 22 permits the distribution cable assembly to be pre-engineered and manufactured without absolute accuracy in the placement of the mid-span access location 34. The tether cable 22 is typically securely lashed to the distribution cable 24 via cable ties 50 as shown, or by strapping, lashing, clamps or other like fasteners, at predetermined intervals along the length of the tether cable 22 and distribution cable 24. The cable ties 50 inhibit movement of the tether assembly 20 along the length of the distribution cable 24. The distribution cable 24 and the tether cable 22 may be lashed together in the factory and wound onto a reel as a pre-engineered distribution cable assembly. The tether assembly 20, including the tether cable 22 and the distribution cable 24, are sufficiently flexible so as to permit the assembly to be wound onto a cable reel, shipped and deployed through conduit or conventional aerial lashing equipment. The cable ties 50 remain in place during deployment of the distribution cable 24 and may be removed following deployment when the mid-span access location 34 is utilized as a distribution or termination point in the fiber optic communications network. In deployments in which the tether assembly 20 is interconnected with the distribution cable 24 after installation, the tether cable 22 is interconnected at the mid-span access location 34 as described above. The connector ports 28 are then positioned at a desired location within the network. Depending upon the amount of slack length of the tether cable 22 needed to be managed, the slack length may be coiled and lashed to the distribution cable 24. The slack may also be secured to a pole or stored within a pedestal depending upon the deployment environment. In instances in which the tether cable 22 is attached to the mid-span access location 34 and the slack cable is coiled, the connector ports 28 may be rotated relative to the distribution cable 24 to relieve torsion during coiling.

Figure 4:
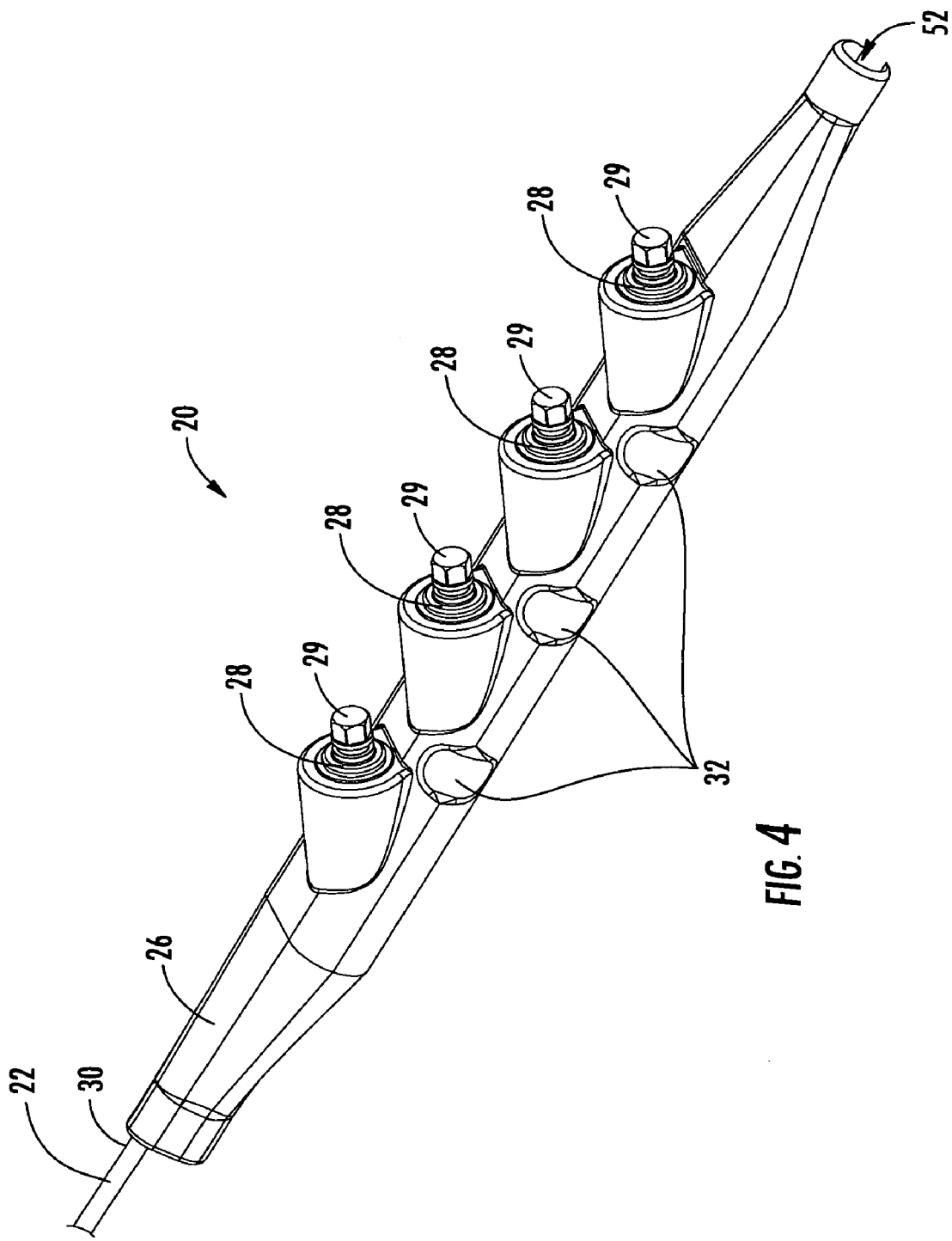
FIG. 4 is a perspective view of an adjustable tether assembly including a plurality of connector ports arranged in a linear fashion, a length of tether cable and a C-shaped overmolded housing for receiving a distribution cable in accordance with yet another exemplary embodiment of the present invention.

Referring now to FIG. 4, a perspective view of another tether assembly 20 having a tether cable 22 for attaching to a distribution cable (not shown) is shown. In this embodiment, connector ports 28 secured within the overmolded housing 26 provide access to one or more pre-connectorized optical fibers optically connected to preterminated optical fibers of the distribution cable 24. While the embodiment of the tether assembly 20 shown in FIGS. 1 and 2 includes a housing 26 overmolded around the distribution cable 24 to permit the connector ports 28 to be slidably positioned along the length of the distribution cable 24, the housing 26 shown in FIG. 4 defines a C-shaped opening 52 for receiving a distribution cable 24. Thus, the tether assembly 20 shown in FIG. 4 may be removed from and positioned away from the distribution cable 24. As in the previous embodiment, the tether assembly 20 may be used to readily interconnect optical fibers of one or more connectorized fiber optic drop cables with the preterminated optical fibers of the fiber optic distribution cable 24 at a desired location in a fiber optic communications network. The connector ports 28 of the tether assembly 20 may be positioned along the length of the distribution cable 24 or may be positioned at a pole, pedestal, vault or other convenient location within the network. The tether cable 22 and removable connector ports 28 allow a field technician to position the tap point and readily connect, disconnect or reconfigure drop cables extending to downstream locations. Once positioned, the tether cable 22 is preferably lashed to the distribution cable 24 using cable ties 50 at intervals along the length of the tether cable 22. Alternatively, the tether assembly 20 may be shipped attached to the distribution cable 24 and routed separately from the distribution cable 24 following deployment of the distribution cable 24 to a desired location in the fiber optic communications network in order to compensate for an error in the placement of the mid-span access location 34.

Figure 5:
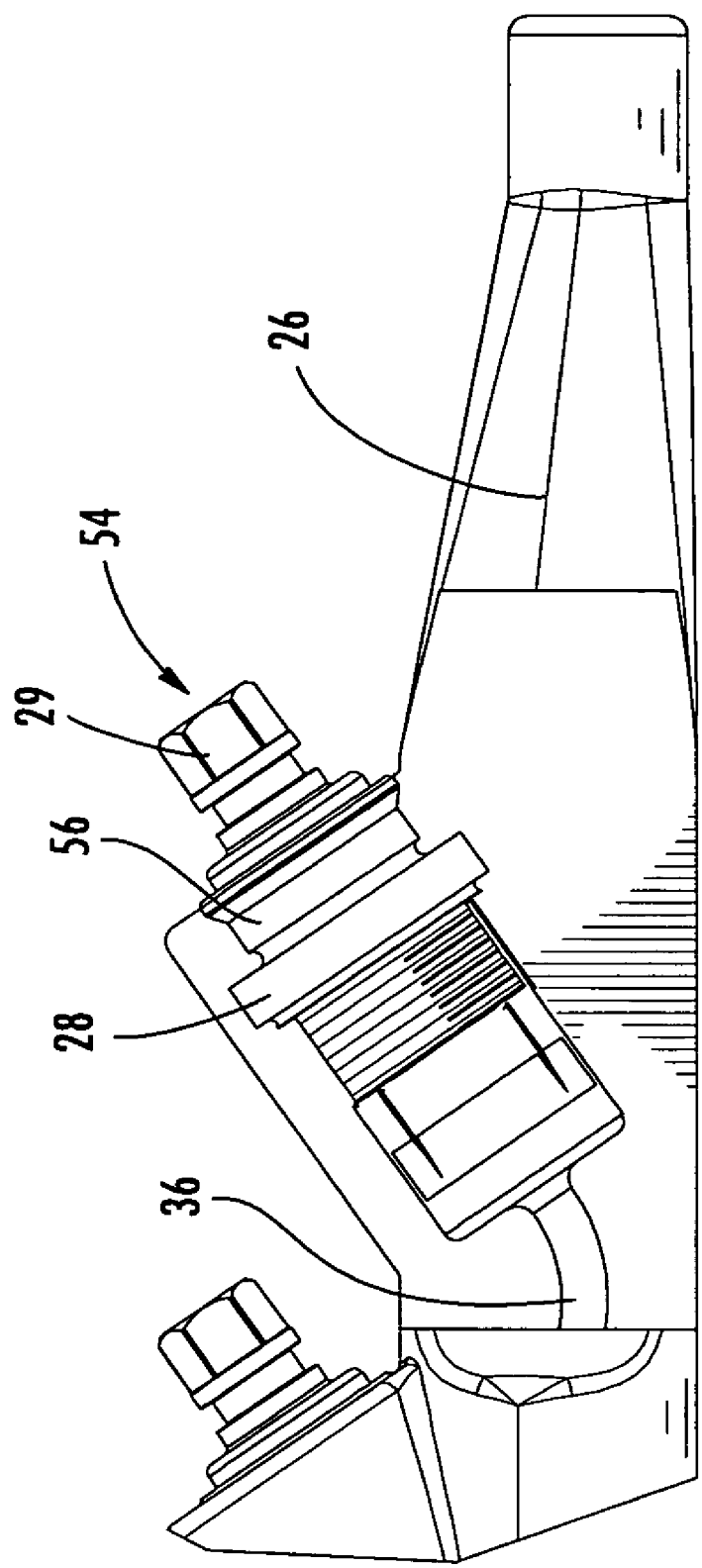
FIG. 5 is a side view of the downstream end of the tether assembly of FIG. 4 shown with a portion of the overmolded housing removed in order to illustrate the receptacle of one of the connector ports secured within the overmolded housing and covered with a protective dust cap.

Referring to FIG. 5, a side profile view of the downstream end of the tether assembly 20 of FIG. 4 is shown with a portion of the overmolded housing 26 removed in order to illustrate a typical connector port 28 secured within the overmolded housing 26 and covered with a protective dust cap 29. In this particular embodiment, the protective dust cap 29 defines a gripping surface 54 for removing the cap 29. The dust cap 29 prevents water and other contaminants from penetrating the connector port 28 and damaging the optical fiber(s) disposed within. The connector ports 28 are preferably oriented at an angle within the housing 26 relative to the distribution cable 24 in order to reduce the overall diameter of the tether assembly 20 and distribution cable 24. Optical fibers 36 of the tether cable 22 (shown within a protective outer sheath or jacket) are routed to their respective connector ports 28 and presented for interconnection. The optical fibers 36 of the tether cable 22 are preferably connectorized and received within a receptacle, adapter or alignment sleeve (not shown) disposed within the connector port 28. As shown, the connector port 28 includes a receptacle 56 that may be secured by the overmolding material or may be threaded into an opening defined by the overmolded housing 26. By threading the receptacle 56 into the housing 26, the receptacle 56 may be removed from the housing 26 in order to access the backside of the receptacle 56 for cleaning and the optical fiber(s) 36. A slack length of optical fiber 36 may be stored in the housing 26 within a protective outer sheath or jacket that is overmolded with the housing 26 so that the slack length may be withdrawn from the overmolding material.

Figure 6:
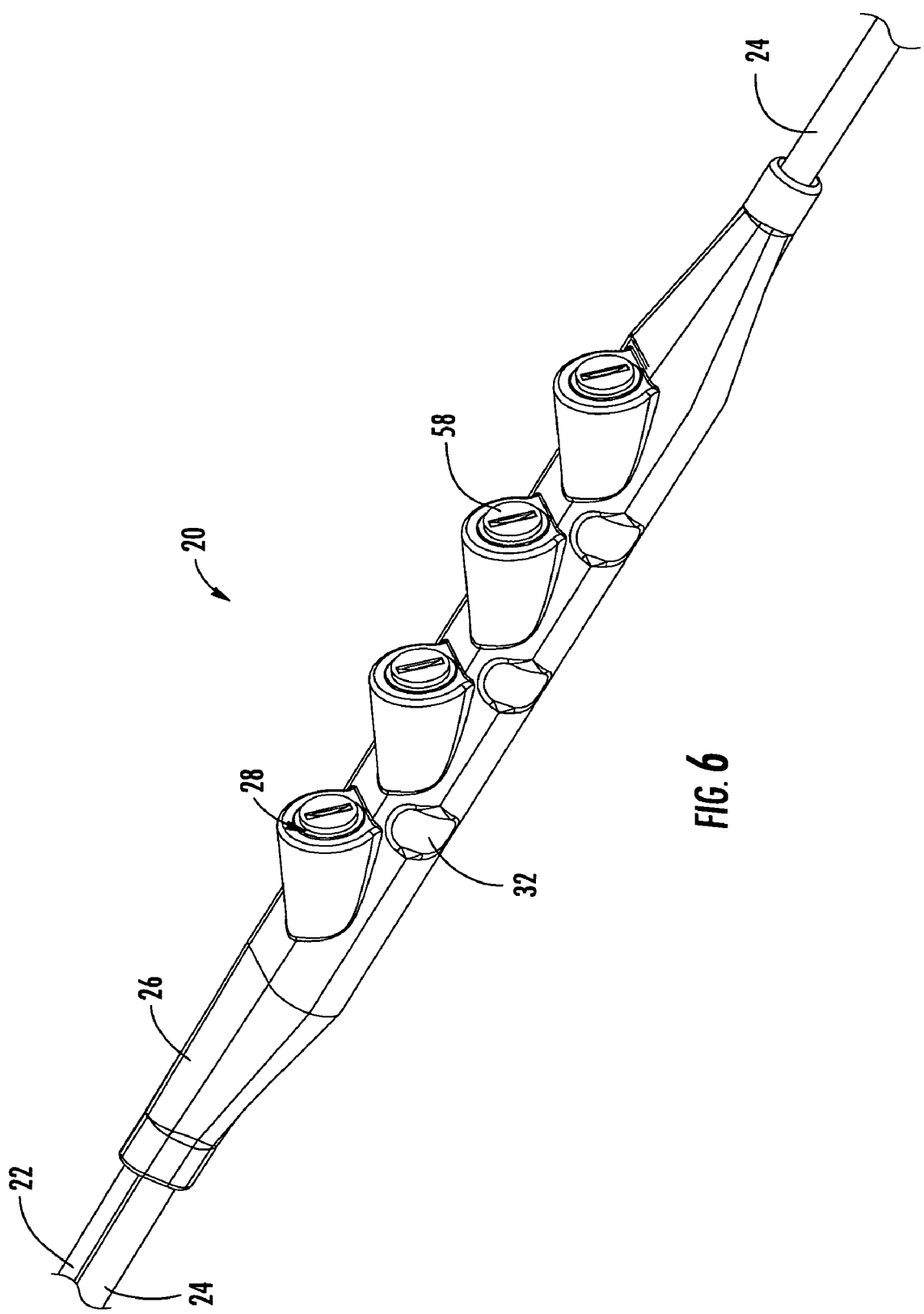
FIG. 6 is a perspective view of the tether assembly of FIG. 1 wherein the plurality of connector ports are provided with low-profile dust caps that streamline the tether assembly and reduce snagging during installation of the distribution cable.
Figure 7:
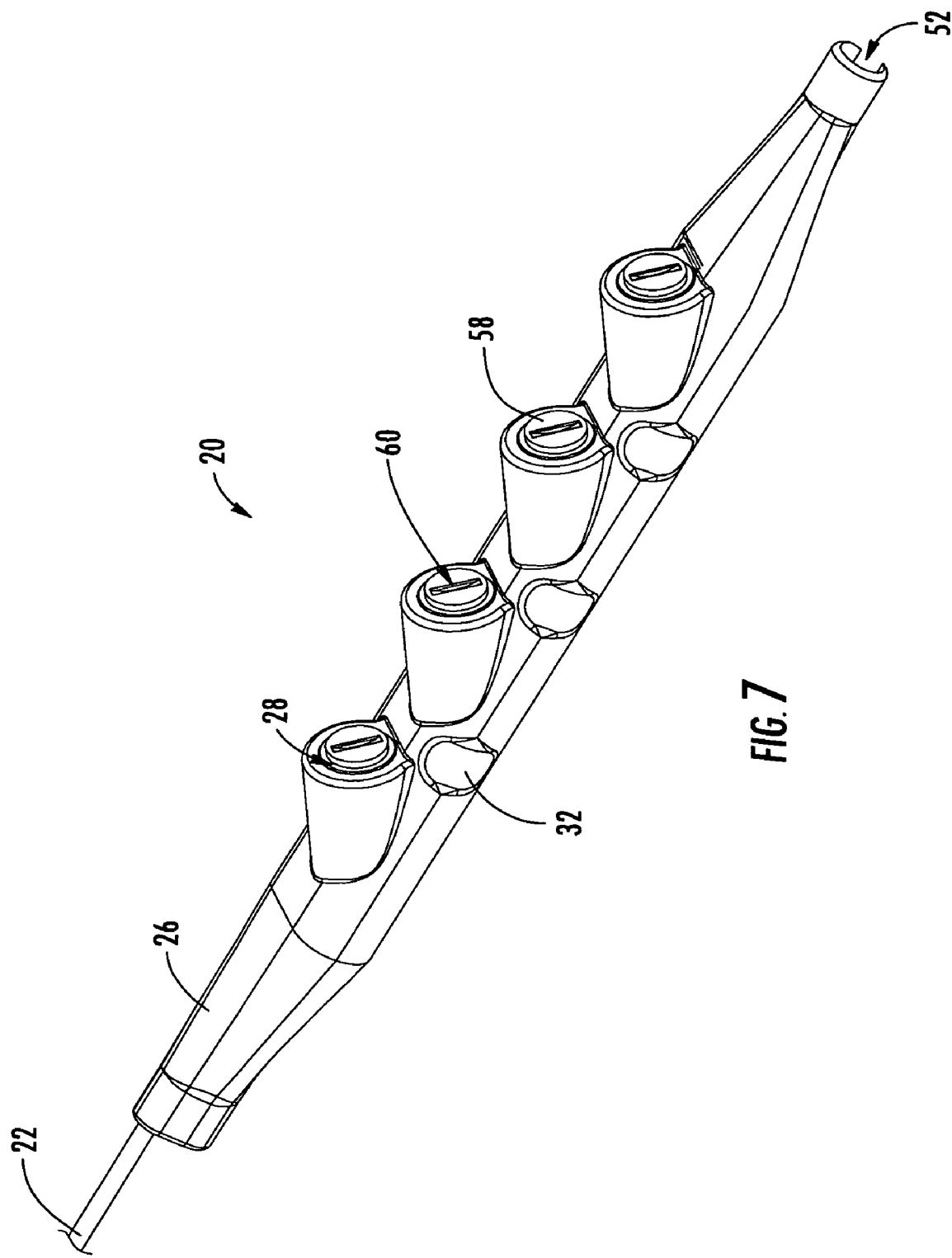
FIG. 7 is a perspective view of the tether assembly of FIG. 4 wherein the plurality of connector ports are provided with low-profile protective dust caps that streamline the tether assembly and reduce snagging during installation of the distribution cable.

Referring to FIGS. 6 and 7, additional embodiments of a tether assembly 20 in accordance with the present invention are shown. As shown in FIG. 6, the housing 26 is overmolded around the distribution cable 24 such that the tether assembly 20, and in particular the connector ports 28, is slidable along the length of the distribution cable 24. As shown in FIG. 6, the housing 26 defines a C-shaped channel 52 for receiving a distribution cable 24 such that the tether assembly 20, and in particular the connector ports 28, may be slideably positioned along the length of the distribution cable 24, or removed entirely from the distribution cable 24 and positioned at a desired location within a communications network. The embodiments shown in both FIG. 6 and FIG. 7 include low-profile dust caps 58 that reduce the overall diameter of the tether assembly 20 and the distribution cable 24. This is an important feature in deployments in which one or more factory-prepared tether assemblies 20 are connected to the distribution cable 24 prior to installation of the distribution cable 24 in a fiber optic communications network The low-profile dust caps 58 reduce the possibility of snagging during installation through conduits, around pulleys and through conventional aerial lashing equipment, such as sheaves or rollers. The low-profile dust caps 58 further define a slot 60 for receiving a tool, such as a screwdriver blade or coin, to loosen and tighten the dust caps 58. The dust caps 58 may be threaded into their respective connector port 28, may be snap-fit, or may be provided with a loose press fit.

Figure 8:
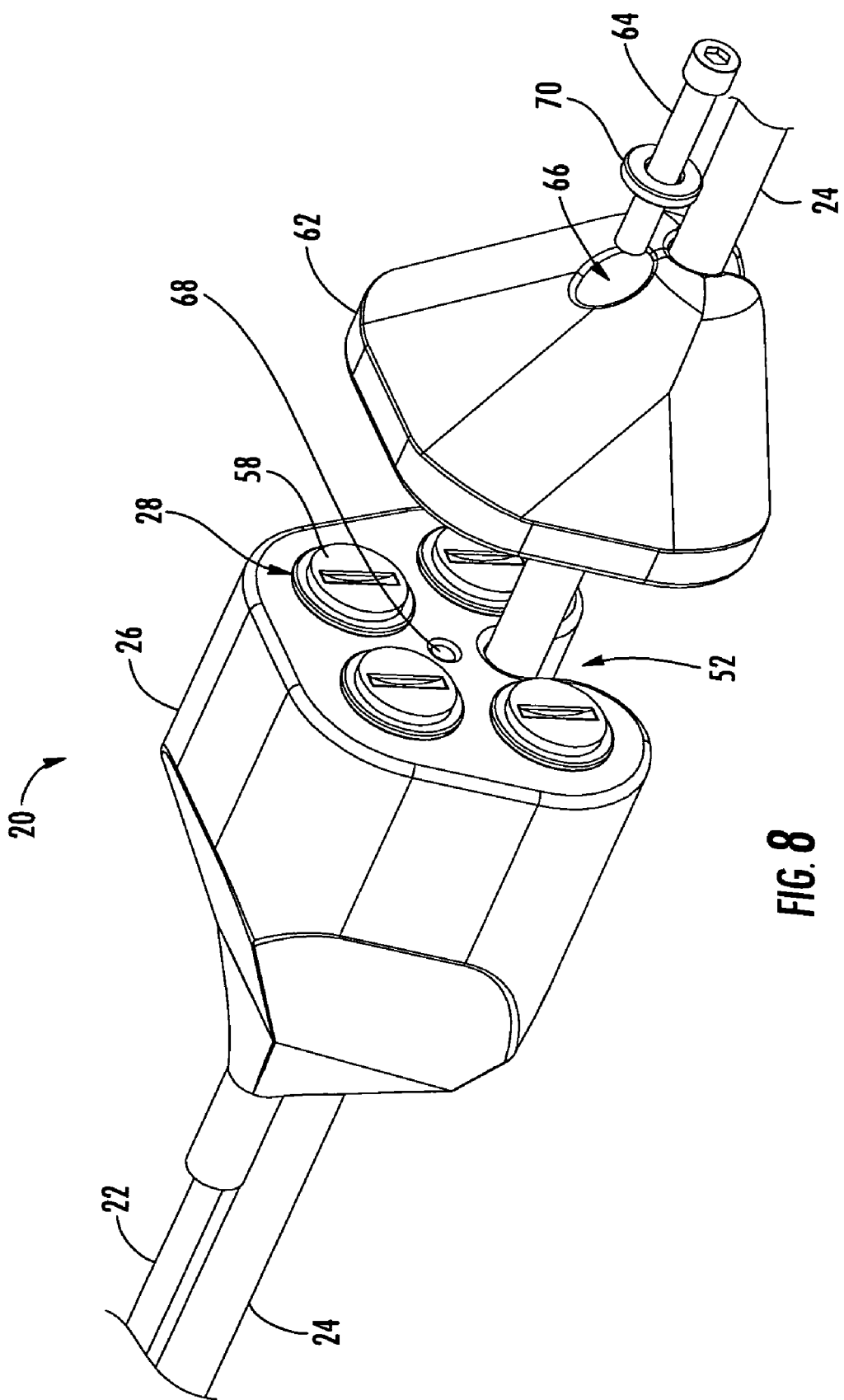
FIG. 8 is a perspective view of an adjustable tether assembly including a plurality of connector ports arranged radially around the distribution cable, a length of tether cable, and an overmolded housing having a removable cover with a distribution cable passing therethrough in accordance with yet another exemplary embodiment of the present invention.
Figure 9:
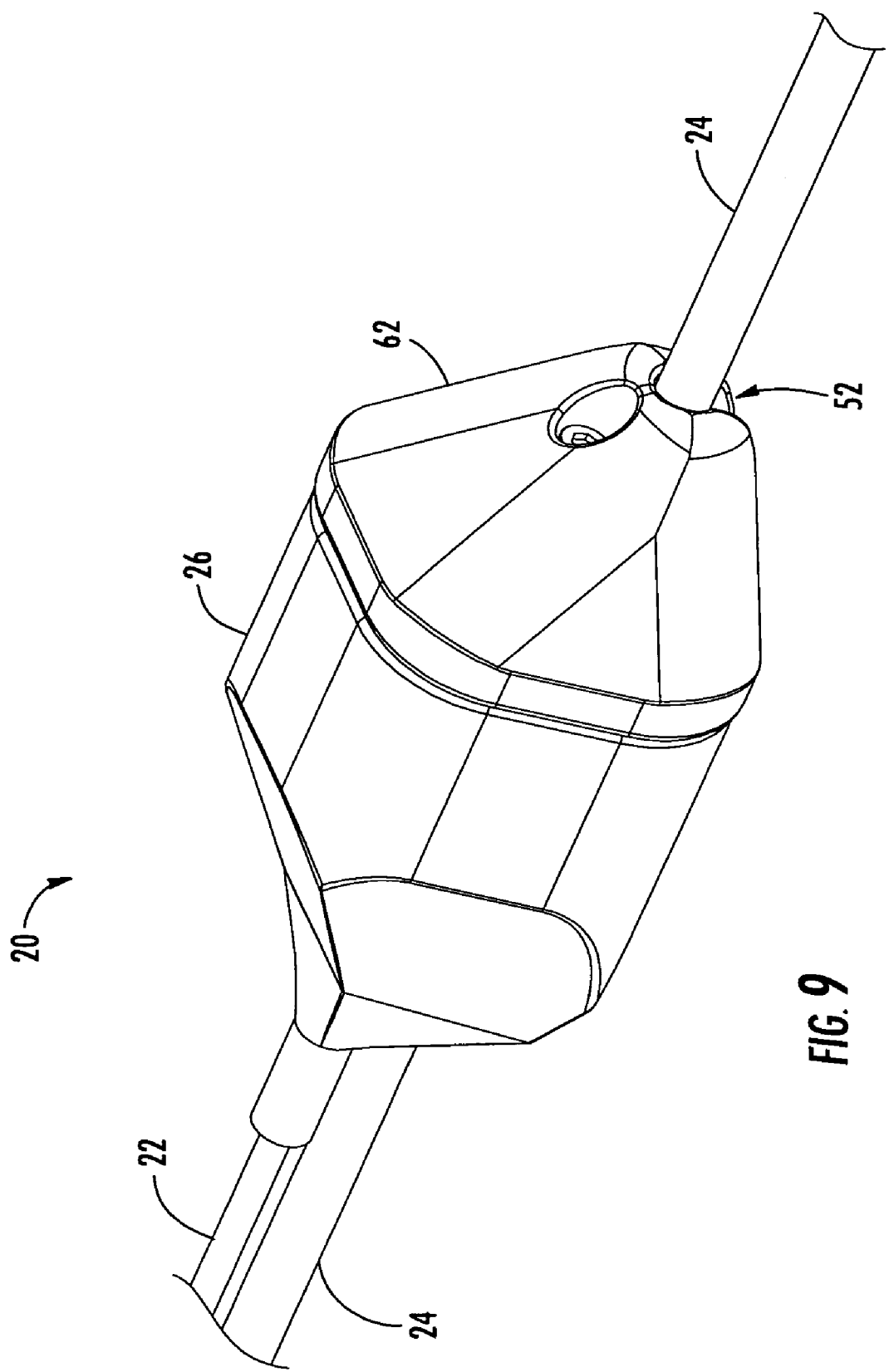
FIG. 9 is a perspective view of the tether assembly of FIG. 8 shown with the cover secured to the housing in a closed position.

Referring to FIGS. 8 and 9, a perspective view of an adjustable tether assembly 20 including a plurality of connector ports 28 arranged radially around the distribution cable 24 and including a relatively short length of tether cable 22 is shown. FIG. 8 illustrates the overmolded housing 26 and a removable cover 62 shown in an opened position, while FIG. 9 illustrates the cover 62 in a closed position and secured to the housing 26. As shown, the tether assembly 20 includes four connector ports 28 positioned adjacent one end of the housing 26 and oriented axially for providing access to multiple optical fibers 36 of the tether cable 22. However, the overmolded housing 26 may have any shape and may define any number of optical connection nodes comprising, for example, a radial arrangement of four optical connection nodes on each side of the housing 26 for a total of eight nodes. In preferred embodiments, the optical fibers 36 of the tether cable 22 are connectorized and secured by a receptacle, adapter or alignment sleeve within the connector port 28, as previously described. Unoccupied connector ports 28 may be covered with protective dust caps 58 that function as both dust caps and to provide a low-profile outer diameter for the tether assembly 20 and the distribution cable 24.

The tether assembly 20 includes a main housing portion 26 and a removable cover 62. In the embodiment shown, the cover 62 is secured to the housing 26 using a screw 64 or like fastener received through an opening 66 defined by the cover 62 and secured within a threaded opening 68 of the housing 26. An elastic washer 70 may be positioned on the screw 64 to maintain an adequate moisture seal at the opening 66. A seal may be provided at the interface between the cover 62 and the housing 26 by an interference fit, or by gel or grease in a known manner. In an alternative embodiment, an elastomeric gasket (not shown) may be disposed between the cover 62 and the housing 26. The gasket is compressed as the screw 64 is tightened, thereby providing an adequate moisture seal. The housing 26 may be overmolded around the distribution cable 24 or may be molded as shown to define a C-shaped channel 52 for receiving a distribution cable 24.

The exemplary embodiments of an adjustable tether assembly 20 according to the present invention shown and described herein provide a number of significant advantages over previously known solutions for mitigating span length measurement differences and providing interconnection points. The tether assembly 20 provides the ability to correctly position an interconnection point for a mid-span access location within a communications network in which the mid-span access location is positioned incorrectly following installation of the distribution cable 24. By providing a tether assembly 20 including a tether cable 22 having a predetermined length, the tether cable 22 further provides the ability to extend the optical communications network laterally from the distribution cable 24, for example across a street. In addition to the advantages described above, a tether assembly 20 constructed in accordance with the present invention provides a field technician with the ability to readily connect, disconnect and reconfigure optical connections at a convenient network distribution or termination point regardless of the position of the corresponding mid-span access location. In several of the embodiments described above, connectorized fiber optic drop cables may be readily connected to "quick connect" receptacles or adapters secured within the housing 26 at the free end of the tether cable 22.

The foregoing is a description of various embodiments of the invention that are given here by way of example only. Although fiber optic distribution cables including tether assemblies having at least one connector port and a relatively short length of a tether cable have been described with reference to preferred embodiments and examples thereof, other embodiments and examples may perform similar functions and/or achieve similar results. All such equivalent embodiments and examples are within the spirit and scope of the present invention and are intended to be covered by the appended claims.

That which is claimed is:

1. A fiber optic cable assembly, comprising:
   a fiber optic cable including at least one mid-span access location;
   an overmolded body positioned over the at least one mid-span access location;
   a tether cable having a first end attached to the overmolded body and including at least one optical fiber optically connected to at least one terminated optical fiber of the fiber optic cable;
   a protective housing secured to a second end of the tether cable and attached to the fiber optic cable, the housing comprising at least one connector port; and
   a receptacle within the at least one connector port operable for receiving a connectorized fiber optic drop cable and optically connecting at least one optical fiber of the connectorized fiber optic drop cable with the at least one optical fiber of the tether cable;
   wherein the protective housing is adjustable along the length of the fiber optic cable; and
   wherein the at least one terminated optical fiber is terminated at the at least one mid-span access location.

2. The assembly of claim 1, wherein the housing is removably attached to the fiber optic cable for the purpose of positioning the at least one connector port at a desired location within a fiber optic communications network.

3. The assembly of claim 1, wherein the housing is overmolded around the fiber optic cable such that the housing is slidable along the length of the fiber optic cable.

4. The assembly of claim 1, wherein the housing has a C-shaped channel for receiving the fiber optic drop cable such that to housing is both slideable along the length of the fiber optic cable and removably attached to the fiber optic cable.

5. The assembly of claim 1, wherein the first end of the tether cable is splice-ready so that the tether assembly may be attached to the fiber optic cable in the field.

6. The assembly of claim 1, wherein the first end of the tether cable is connectorized so that the tether assembly may be attached to the fiber optic cable in the field.

7. The assembly of claim 1, wherein the tether cable has a length greater than about 3 feet and less than about 100 feet.

8. The assembly of claim 1, wherein the fiber optic cable is a fiber optic distribution cable including a plurality of mid-span access locations at predetermined spaced apart positions along the length of the distribution cable, and wherein the tether cable is attached to the fiber optic distribution cable at one of the mid-span access locations.

9. The assembly of claim 1, wherein the receptacle comprises an alignment sleeve operable for receiving and aligning the at least one optical fiber of the tether cable and the at least one optical fiber of the connectorized drop cable.

10. The assembly of claim 1, wherein the housing is overmolded around the fiber optic cable and defines a plurality of connector ports.

11. A fiber optic distribution cable assembly, comprising:
    a distribution cable comprising a tube containing a plurality of optical fibers and at least one mid-span access location positioned along the length of the distribution cable;
    an overmolded body positioned over the at least one mid-span access location;
    at least one optical fiber accessed and terminated from the distribution cable at the at least one mid-span access location;
    a tether cable comprising a first end attached to the distribution cable at the at least one mid-span access location and at least one optical fiber optically connected to the at least one optical fiber accessed and terminated from the distribution cable;
    a housing secured to a second end of the tether cable and attached to the distribution cable, the housing comprising at least one connector port; and
    a receptacle within the at least one connector port operable for receiving a connectorized fiber optic drop cable and optically connecting at least one optical fiber of the connectorized fiber optic drop cable with the at least one optical fiber of the tether cable;
    wherein the position of the housing is adjustable along the length of the distribution cable.

12. The fiber optic distribution cable assembly of claim 11, wherein the tether cable is lashed to the distribution cable and the housing is removable attached to the distribution cable.

13. The fiber optic distribution cable assembly of claim 11, wherein the receptacle comprises a dust cap operable for protecting and sealing the receptacle when the connectorized fiber optic drop cable is not disposed within the receptacle.

14. The fiber optic distribution cable assembly of claim 11, wherein the first end of the tether cable is splice-ready so that the tether assembly maybe attached to the fiber optic cable in the field.

15. The fiber optic distribution cable assembly of claim 11, wherein the first end of the tether cable is connectorized so that the tether assembly may be attached to the fiber optic cable in the field.

16. The fiber optic distribution cable assembly of claim 11, wherein the receptacle comprises an alignment sleeve operable for receiving and aligning the at least one optical fiber of the tether cable and the at least one optical fiber of the connectorized drop cable.

17. The fiber optic distribution cable assembly of claim 11, wherein the housing is overmolded around the distribution cable and defines a plurality of connector ports.

18. A method for mitigating a span length measurement difference in a pre-engineered fiber optic communications network employing a fiber optic distribution cable assembly comprising a distribution cable having a plurality of optical fibers disposed within a sheath and at least one mid-span access location along the length of the distribution cable, the method comprising:

optically connecting an adjustable tether assembly comprising at least one connector port and a tether cable at the at least one mid-span access location and positioning the connector port at a desired location in the fiber optic communications network to compensate for the span length measurement difference; and wherein the tether cable comprises a first end for attachment to the mid-span access location and at least one optical fiber optically connected to at least one accessed and terminated optical fiber of the distribution cable and wherein the tether assembly further comprises a housing secured to the tether cable at a second end and slideably attached to the distribution cable.

19. The method of claim 18, wherein the tether cable is connected to the fiber optic distribution cable in the field.

20. The method of claim 18, wherein the tether cable is connected to the fiber optic distribution cable in the factory.

21. The method of claim 18, wherein the housing is overmolded around the distribution cable and the tether assembly comprises a plurality of connector ports for receiving and optically connecting an optical fiber of a connectorized drop cable with the at least one optical fiber of the tether cable.

* * * * *